United States Patent [19]
Connelly et al.

[11] Patent Number: 5,316,429
[45] Date of Patent: May 31, 1994

[54] BIN LOADING AND EMPTYING OF CROPS HAVING A ROUNDED ROLLABLE MASS

[75] Inventors: Joseph W. Connelly, Creston, Iowa; Clive R. Barlow, Foster City; Clark K. Benson, Millbrae, both of Calif.

[73] Assignee: Heat and Control, Inc., So. San Francisco, Calif.

[21] Appl. No.: 856,489

[22] Filed: Mar. 24, 1992

[51] Int. Cl.$^5$ .............................................. B65G 69/04
[52] U.S. Cl. ..................................... 414/298; 414/299; 414/300
[58] Field of Search .............. 414/179, 188, 293, 298, 414/299, 300, 303; 193/7, 27, 32

[56] References Cited

U.S. PATENT DOCUMENTS

| | | | |
|---|---|---|---|
| 1,234,710 | 7/1917 | Adams | 414/299 |
| 1,259,583 | 3/1918 | Adams | 414/299 X |
| 3,590,981 | 7/1971 | Adrian | 193/7 X |
| 3,891,099 | 6/1975 | Smith | 414/303 X |
| 3,926,290 | 12/1975 | Isojima et al. | 193/27 |
| 4,027,806 | 6/1977 | Weihmuller | 414/300 X |
| 4,285,425 | 8/1981 | Smith | 193/32 X |
| 4,358,237 | 11/1982 | Mackenzie et al. | 414/300 |
| 5,080,873 | 1/1992 | Ono et al. | 414/299 X |

FOREIGN PATENT DOCUMENTS

| | | | |
|---|---|---|---|
| 3631557 | 3/1988 | Fed. Rep. of Germany | 414/293 |
| 3904305 | 8/1990 | Fed. Rep. of Germany | 414/300 |
| 0004833 | 1/1982 | Japan | 414/300 |
| 0216838 | 12/1983 | Japan | 414/300 |
| 1490064 | 6/1989 | U.S.S.R. | 193/32 |
| 0322577 | 12/1929 | United Kingdom | 193/27 |

*Primary Examiner*—Michael S. Huppert
*Assistant Examiner*—James Keenan
*Attorney, Agent, or Firm*—Flehr, Hohbach, Test, Albritton & Herbert

[57] ABSTRACT

Rows of rectangular bins for crop storage have open tops along which an overhead shuttle carriage moves for filling the bins one at a time. An auger on the carriage removes the contents from the incoming conveyor belt for deposit in an assigned bin. An array of declined baffles positioned in the path of the falling product buffers the fall. A product support over the discharge auger minimizes the product bridging effect between the vertical walls of the bin.

10 Claims, 9 Drawing Sheets

BIN LOADING AND EMPTYING OF CROPS HAVING A ROUNDED ROLLABLE MASS

TECHNICAL FIELD

This invention relates to product handling and storage and concerns, more specifically, the loading and unloading of potatoes, sugar beets, onions, turnips and similar root crops as well as fruits such as apples, pears or tomatoes etc. with respect to an array of bins where such products with a rounded rollable mass are stored before processing.

BACKGROUND OF THE INVENTION

Creating food products in large quantities at a commercial processing facility requires usually the storage of large volumes of the unprocessed or raw food product. In the case of products produced from potatoes, turnips, sugar beets, onions or certain fruits, the raw materials are delivered by trailer truck or rail car for inspection and reception into the plant's raw product storage area. Many plant owners wish to maintain the various batch loads of products segregated in the storage facility so that the particular characteristics of each batch of product, such as age, water or sugar content, may be monitored so that the ongoing processing may be adjusted, if necessary, to give the desired optimum end product. Commonly, the raw product in truck load batches is deposited in storage bins and data is taken from each batch, where necessary, so that where possible, each differing batch of incoming raw product may be stored in a dedicated bin.

The above-mentioned vegetables and fruits are harvested mechanically for the most part by equipment moving through the growing field or orchard. Irrespective of the steps taken to harvest these crops in as clean a condition as possible, it is nevertheless found that wet soil, stones, twigs, stems and branches and other vegetable matter are entrained with the crop when delivered to the processing plant. This debris, in many instances, clogs the handling equipment requiring maintenance personnel to use high pressure water for clearing the equipment. Further, handling these crops which have become soft from aging or other conditions sometimes produce a "mush" in the storage facilities and in the related handling equipment where the soft products are squashed, rendering a significant portion of the batch unusable for processing. This results in waste to be discarded.

In the case of handling potatoes for temporary storage prior to processing these products are frequently held in batches deposited in bins of generally a rectilinear plan shape, but with at least one inclined wall where incoming potatoes may roll down to reduce bruising and breakage which would otherwise occur from a vertical free fall. The inclined wall extends out over the base of the bin and, thus a substantial portion of the bin occupies a considerable amount of valuable plant area. "Bridging" of potatoes in a bin frequently occurs where the potatoes will not descend into the withdrawal or discharge mechanism but remain lodged in an arch-like configuration between the sidewalls of the bin. In this instance, a worker must enter the bin with a probe to break up the bridge or arch of potatoes so that the bin may be further emptied and its contents carried through to the processing line. This phenomenon is seen with other products. It is very desirable that the raw product handling system be operated from the plant floor without requiring frequent attention by operators or maintenance personnel to climb a ladder for operational adjustment, especially during the normal bin loading and unloading cycle.

SUMMARY OF THE INVENTION AND OBJECTS

The invention, in summary, is in a system for segregating and storing for reallocation, crops having a rounded rollable mass such as potatoes, turnips, sugar beets, onions, as well as certain fruits and the like and providing a plurality of open top bins of generally rectangular plan arranged in side by side position and having substantial depth so that each bin can receive a substantial volume of product. Incoming conveyor means and discharge conveyor means serve to move the raw product into and out of a selected one of the bins. The incoming conveyor means includes a conveyor belt positioned so that the product on it can be shifted from the margin of the belt into the open top of a selected one of the bins. The conveyor belt is arranged to serve all of the bins disposed in mutual side by side relation. A shuttle carriage is mounted for movement over the open tops of the bins and the conveyor belt, and rotatable auger means are mounted on the shuttle carriage and extend transversely across the full product-carrying width of the conveyor belt and along the open top of a bin selected for filling. The auger drive means rotates the auger for removing raw product from the conveyor belt into the selected bin and an array of baffle members are positioned in the path of the product being lowered so that a stream of product may roll from one baffle member to another and be thus lowered into the bin at a substantially slower rate than in a vertical fall, thereby reducing bruising and breakage of the products.

A general object of the invention is to provide an improved interim storage facility for vegetable and fruit crop products which occupies per unit volume a lesser amount of floor space area and requires less operator and maintenance attention than prior storage systems.

Another object of the invention is to provide, in a storage system of the type described, a provision for handling the mentioned crops in a manner which substantially reduces bruising, breakage and which avoids bridging of the product within a containment bin.

Another object of the invention is to provide a bin system with a highly efficient mechanism for loading a selected bin, and is thereafter employed to load another selected bin in the system.

Another object of the invention is to provide a bin storage system which may be readily loaded and unloaded of crops of the type described, which is readily erected at the plant site and which may be operated more economically despite the debris necessarily entrained with the crops.

Further objects and advantages of the invention will be seen from the following description taken in connection with the drawings described below.

DESCRIPTION OF THE PREFERRED EMBODIMENT

Figure 1:
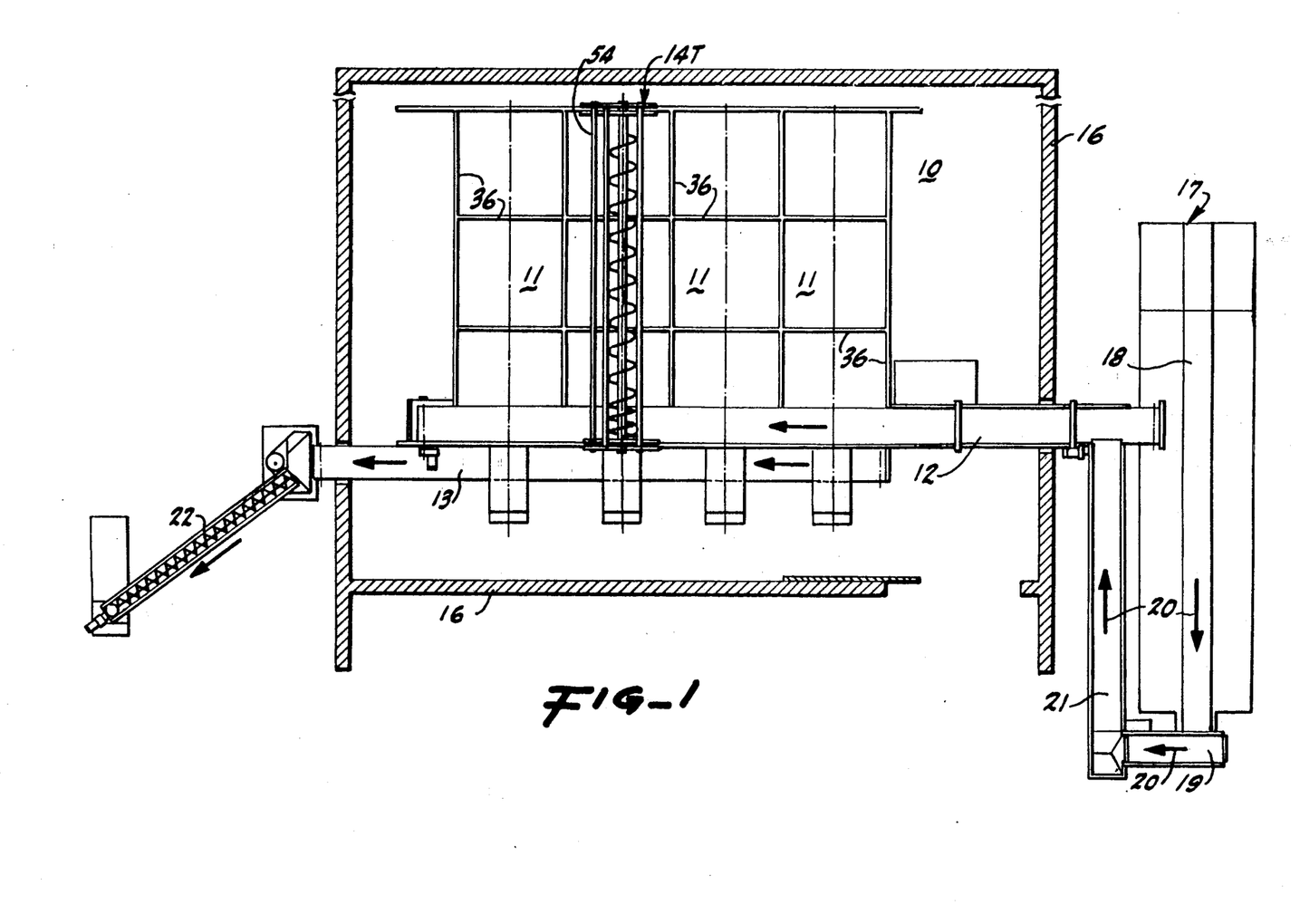
FIG. 1 is a plan view, partially diagrammatic, of a bin storage system of the present invention with portions partially broken away.

The bin storage and handling system 10 is shown in FIG. 1 of the drawings and comprises a plurality of bins 11 each of substantially similar construction, an incoming bin or loading apportioning conveyor 12, a discharge conveyor 13 for removing product from the bin and a shuttle carriage 14 arranged for movement above the bins 11 for loading them.

The bin storage and handling system 10 is disposed in a protective building enclosure 16 on the outside of which is a root crop unloading facility 17 such as a loading/unloading dock for receiving semi-trailers loaded with products including potatoes, turnips, sugar beets, onions fruits or the like. The characteristic common to the products accommodated by the subject system is that of having a rounded rollable mass and a "skin" integrity sufficient to withstand being placed in a pile and sufficient to resist the forces of mechanical handling. A series of upwardly inclined conveyors 18, 19 and 21 move the raw products as indicated by the direction arrows 20 from the unloading facility 17 to the incoming or bin loading conveyor 12. Commonly, the conveyors 12, 13, 18–21 include a continuous, rubberized fabric belt well known in this field.

Figure 12:
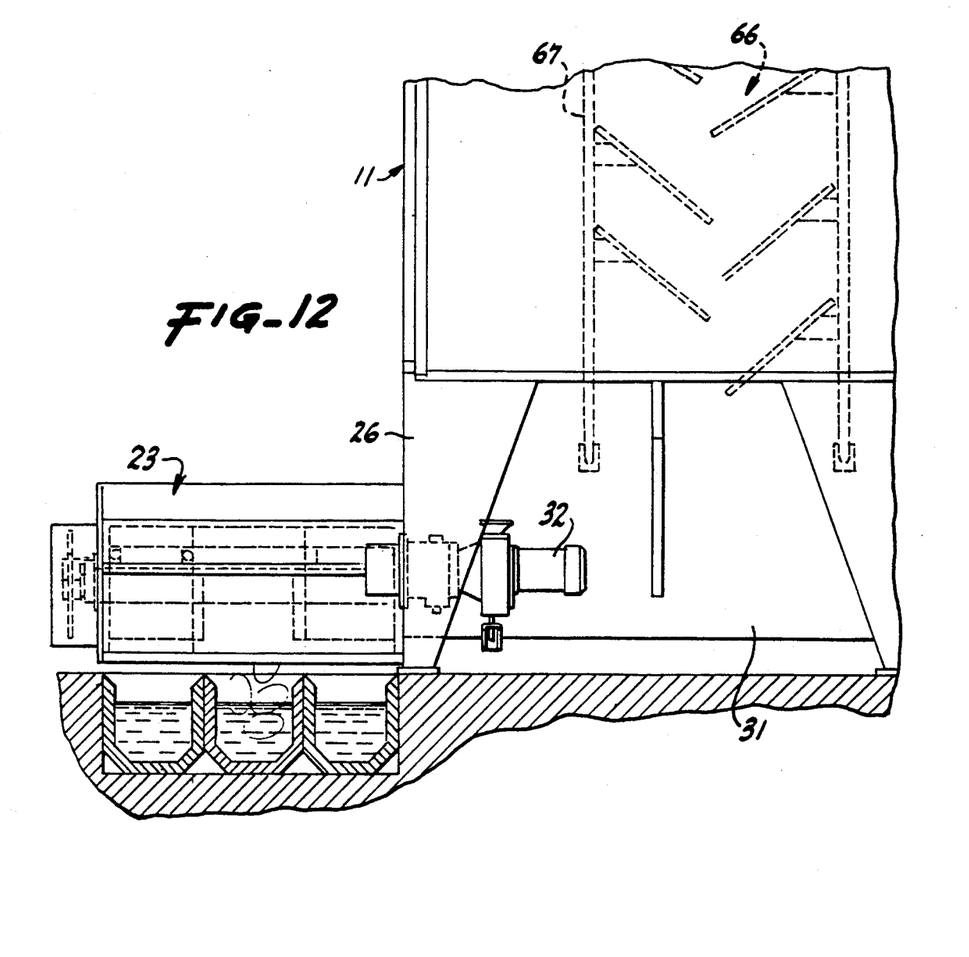
FIG. 12 is a fragmentary elevational view of a water flume discharge from the bottom of the bins.

Products are delivered from the bin storage and handling system 10 and removed from the building 16 through a takeaway auger or belt 22 into the processing plant (not shown) as required in the manufacture of, for example, potato chips, french fried potatoes, deep fried onions, etc. as the case may be. The takeaway unit 22 may also take the form of a water flume 23 frequently seen in the potato processing field as illustrated in FIG. 12.

Figure 2A:
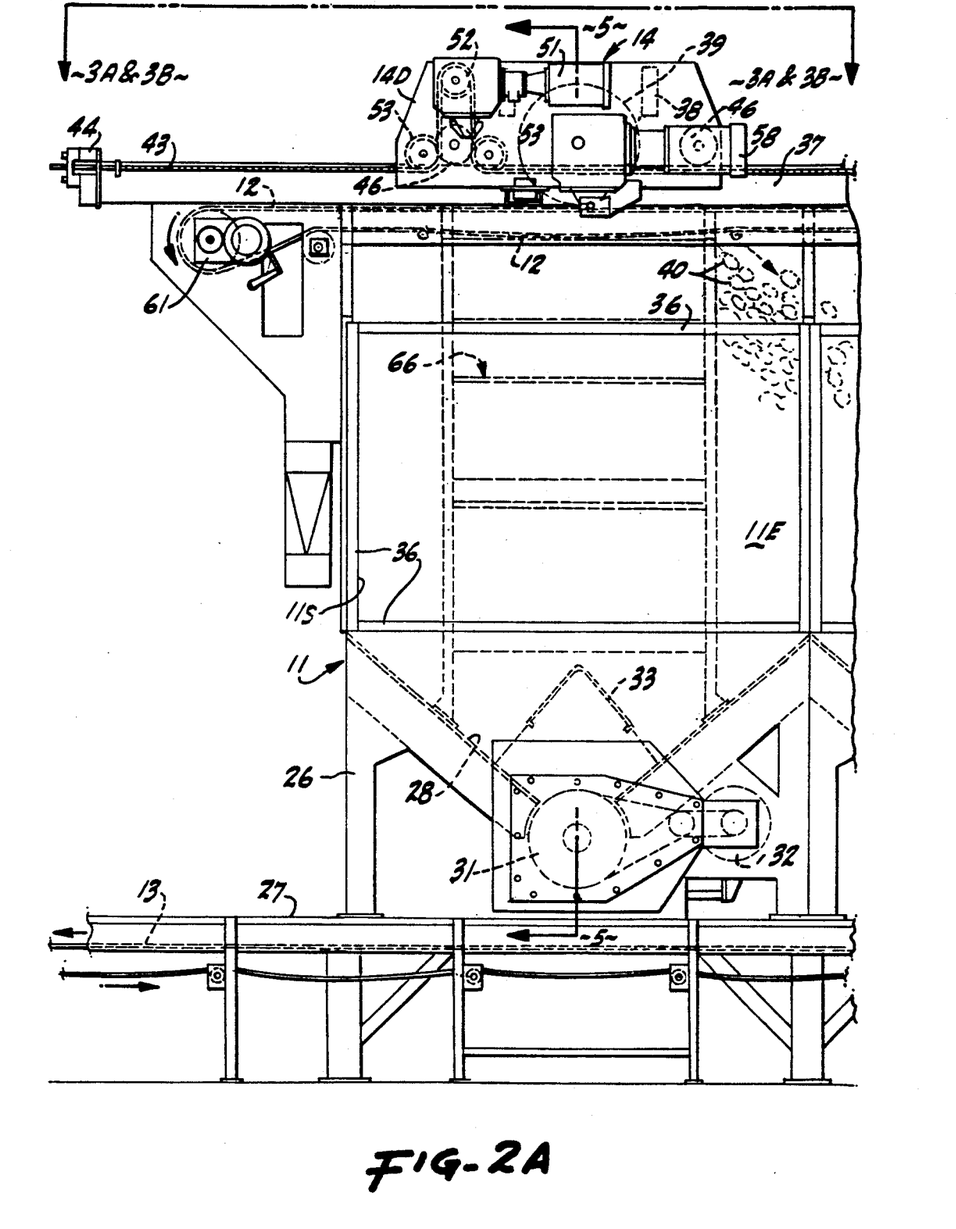
FIG. 2A and FIG. 2B are enlarged elevational views of one end bin and one of the middle bins, respectively, shown broken away.
Figure 2B:
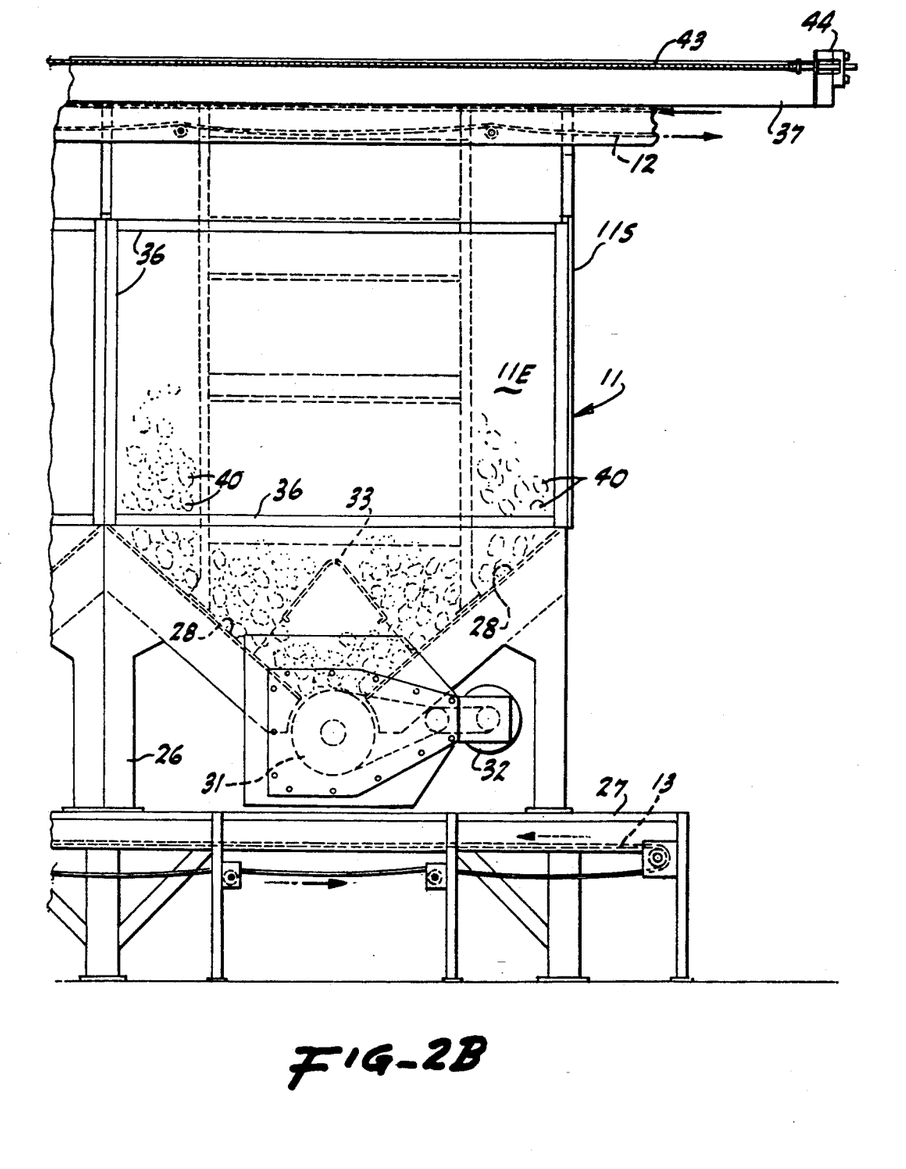

The product bins 11 are illustrated in FIG. 1 as an array of four open top structures, generally of rectilinear outline when viewed in plan, and of substantially similar construction. Although four bins 11 are shown in FIG. 1, this is only by way of an example, because the number may vary from two to twenty or more bins disposed within the protective enclosure 16. The bins may be arranged also in parallel rows as determined by the available floor space within the building 16, or where the climate permits, the bins may be arranged out of doors with no protective structure. A typical end bin is shown in FIG. 2A and a typical one of the middle bins is shown in FIG. 2B. The bins 11 are supported by a structural steel framework 26 from the building floor 27. The structural steel framework 26 may be fabricated either on site or in a fabrication facility before being delivered to the site and erected. The bins 11 are of "vee" bottom 28 construction but have vertical walls, including the vertical end walls 11E and side walls 11S. The side walls 11S may be fabricated from sheet steel secured to a structural steel framework by techniques well known in this field. Adjacent bins may share a common side wall 11S. A typical width of a bin is 7 feet 6 inches, a typical length is 23 feet 7 inches, height above the plant floor about 11 feet 3 inches with volume of 13,095 cf calculated on the product's 40° angle of repose. With a product having a 42 lbs. per cf density the bin capacity is about 58,590 lbs. and, with a product having 45 lbs. per cf density, the bin may contain 62,775 lbs. Various other sizes and capacities will occur to those skilled in this field.

Figure 5:
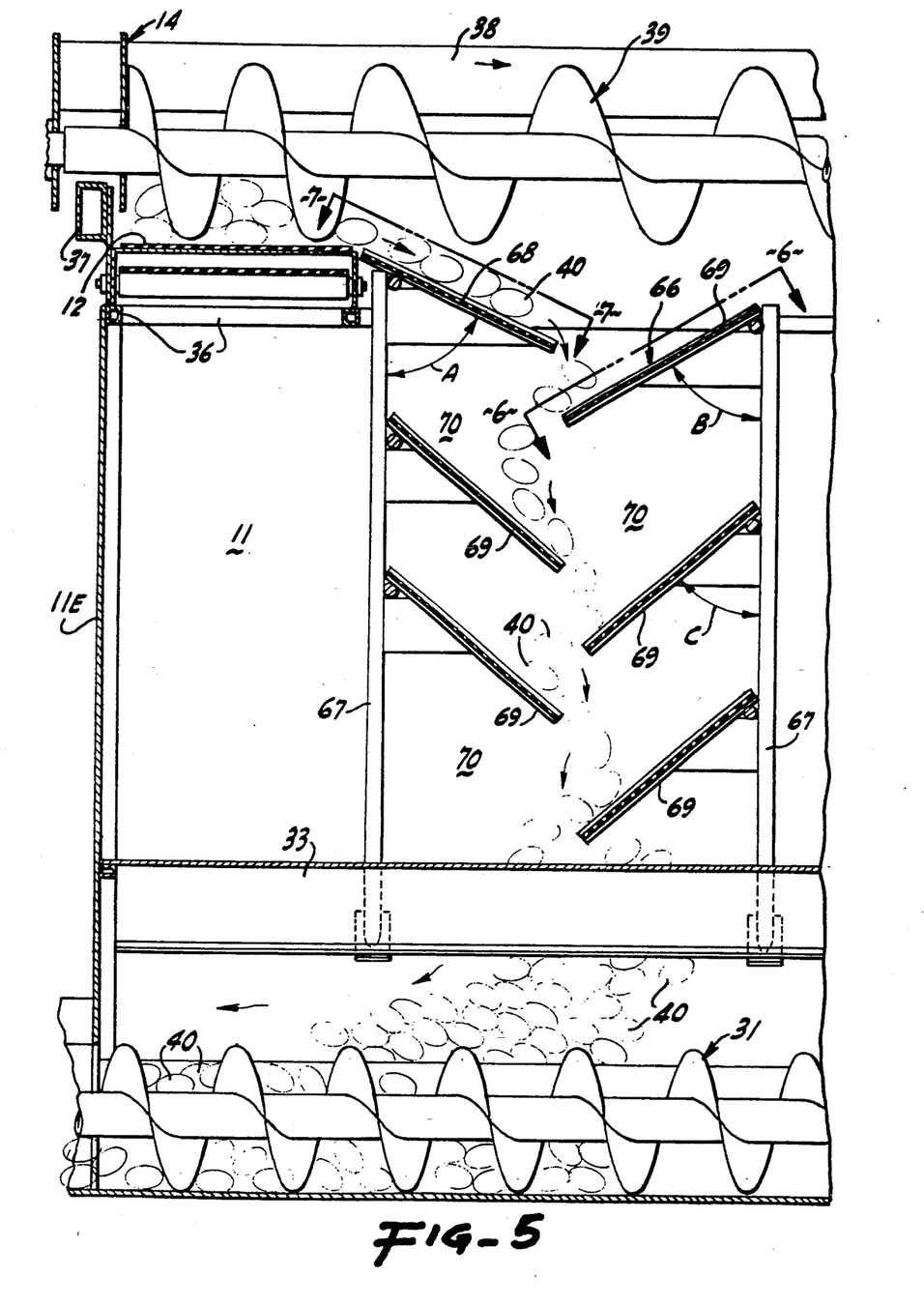
FIG. 5 is a sectional view of a bin taken in the direction of the arrows 5—5 in FIG. 3A.

A longitudinally extending discharge belt or auger 31 is arranged in the bottom of each bin 11 and more particularly in the narrow portion of the vee bottom 28. The discharge auger 31 for each bin 11 is driven by a variable speed auger drive 32 so that products may be removed from the bin through an end discharge opening (not shown) onto the discharge conveyor 13 or to the flume 23, FIG. 12. Arranged within the bin, and spaced above the discharge auger 31 is a load support baffle 33 for reducing the product load on the discharge auger. The baffle 33 extends the full length of the bin and has a generally "A" shape in lateral cross-section as shown in FIGS. 2A, 2B and 5. The shape and position of the baffle 33 as shown encourages and permits air flow through the bin 11.

Figure 3A:
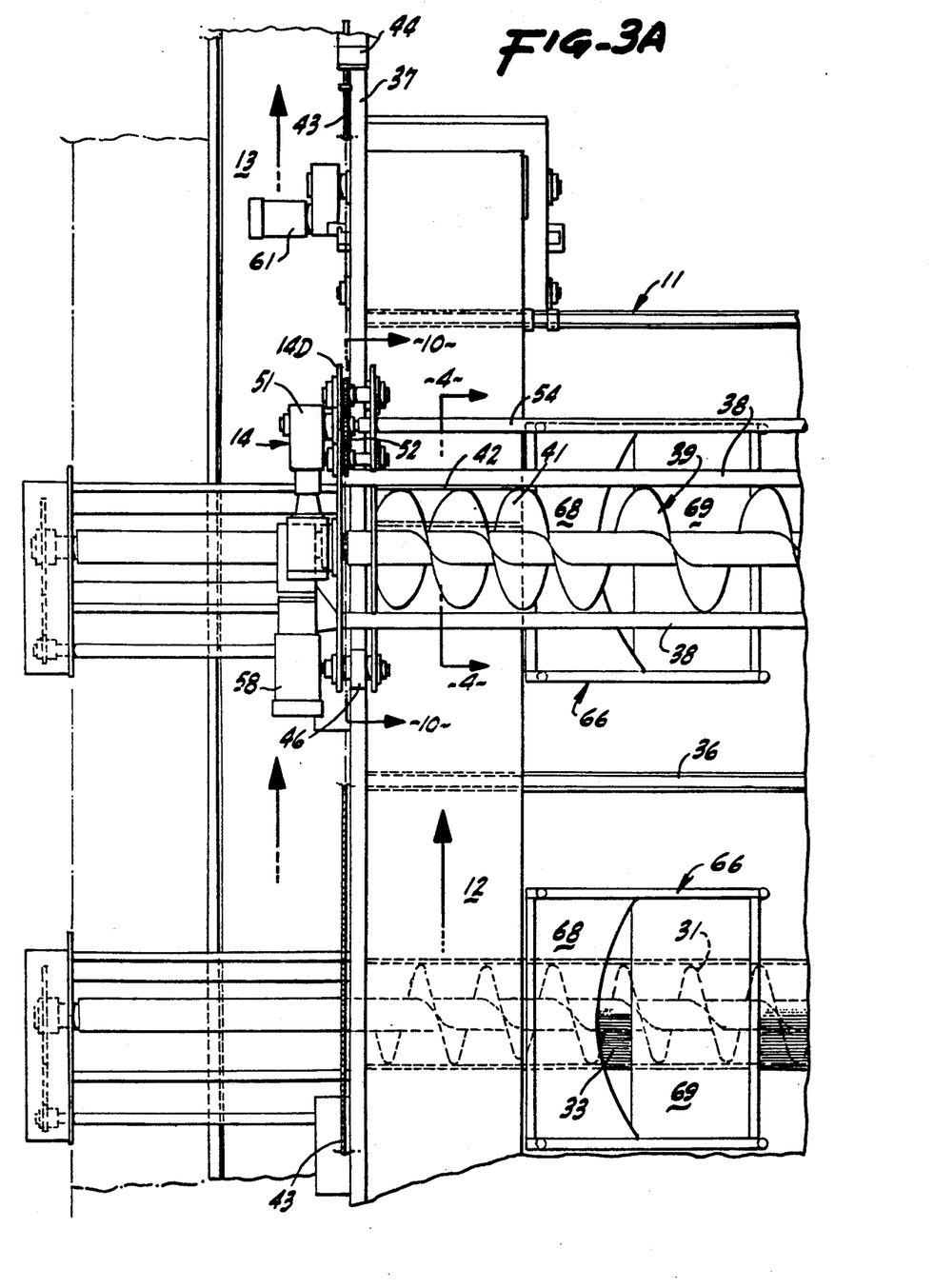
FIG. 3A and FIG. 3B are further enlarged partial sectional views taken in the direction of the arrows 3A and 3B respectively in FIG. 2A.
Figure 3B:
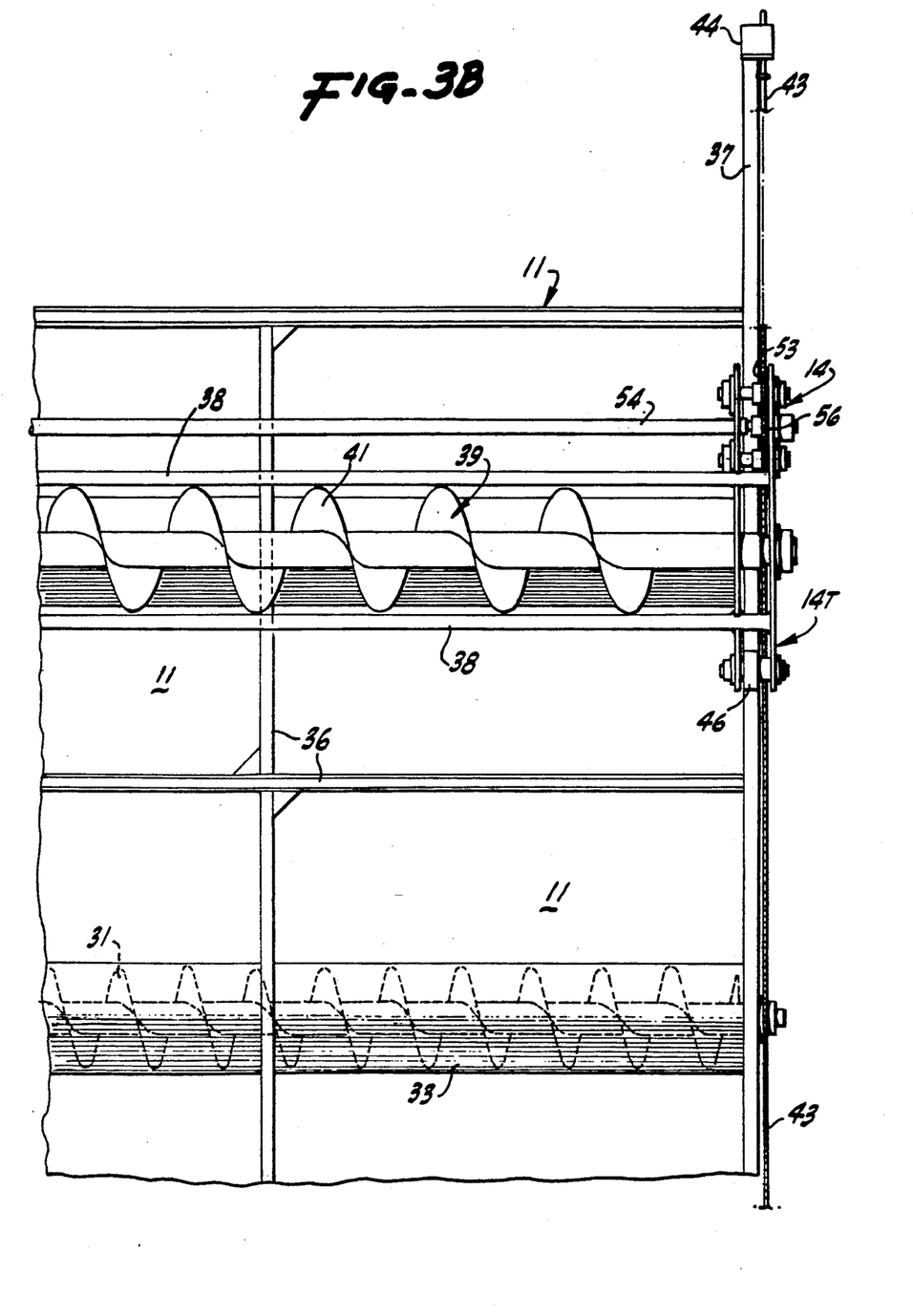
Figure 4:
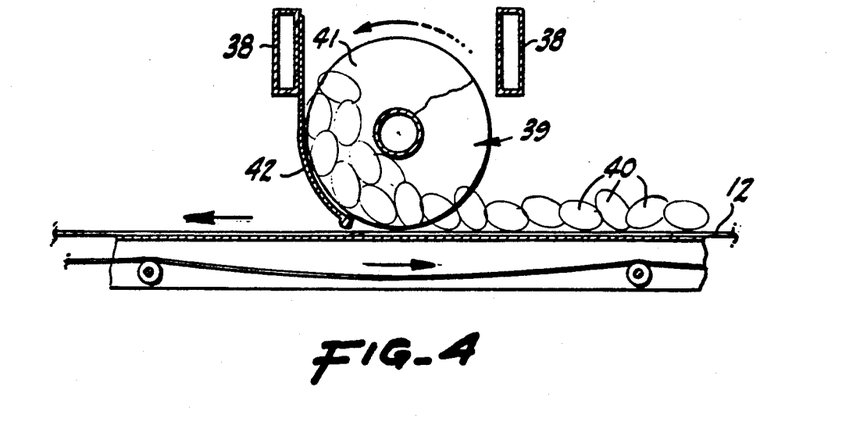
FIG. 4 is a sectional view taken in the direction of the arrows 4—4 in FIG. 3A.

Referring now to FIGS. 1–3 and 5, rigidity is supplied to the bins by the stiffener members 36 arranged horizontally in a plurality of tiers up the side walls of the bins 11. The stiffener members 36 may be fabricated from a closed section structural member such as pipe or box tubing. As shown best in FIGS. 3A and 3B, shuttle rails 37 are mounted on each side of the bin array, across the front and the back of the bins, providing both stiffening to the bin group as well as the rail upon which the shuttle carriage 14 may traverse over the bin tops. The shuttle carriage 14 includes a drive end 14D and a tracking end 14T (FIGS. 3A and 3B), the ends being interconnected by a plurality of cross struts 38 providing rigid support for a bin filling auger 39 journalled at its ends in the carriage sides 14D and 14T. As shown in FIGS. 3A and 4, the in-feed auger 39 overlies the full width of the product apportioning or incoming conveyor 12 and acts to remove products from the conveyor 12 into the selected one of the bins. For example, a 24 inch diameter in-feed auger was found satisfactory and a double pitch of flights 41 was arranged on the auger in the portion thereof which overlies the incoming conveyor 12. A root crop such as potatoes or the like 40 when delivered in the conveyor belt 12 was efficiently removed by the auger into the bin.

The auger is mounted for rotation so that the flights 41 clear the belt of the conveyor 12. A shroud plate or fender 42, best shown in FIGS. 3A and 4, is securely mounted to one of the strut members 38 of the shuttle carriage 14 closely spaced from the auger double flights 41 and extends the full width of the conveyor belt 12. The shroud plate ensures that all the raw crops 40 carried by the conveyor 12 will be removed by the auger's double flights 41 and proceed down into the bin. The direction of auger rotation and conveyor belt movement is shown by the arrows in FIG. 4.

Figure 10:
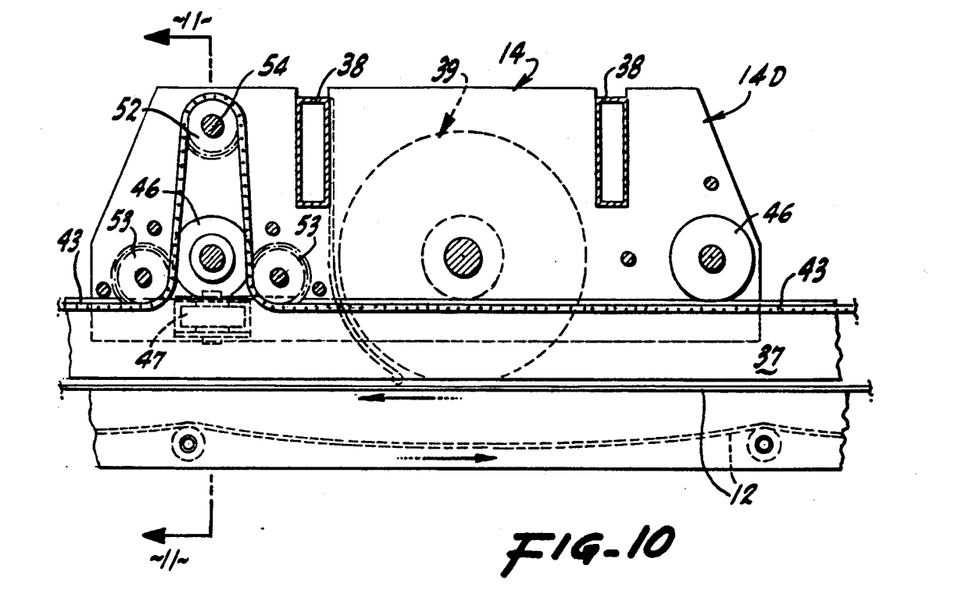
FIG. 10 is an enlarged sectional view taken in the direction of the arrows 10—10 in FIG. 3A.

Considering now in more detail the provisions for moving the shuttle carriage 14 over the open tops of the bins 11, a pair of drive chains 43 are arranged one on each side of the bins and extending the full length of the bins array. The chains 43 are anchored at their ends along the shuttle rails 37 in a mounting 44. Best shown in FIG. 10, a spaced apart pair of support wheels 46 are suitably journalled to the tracking side 14T of the carriage and support the carriage end for movement along the rail 37. Similarly, on the drive side 14D of the carriage shown in FIGS. 2A, 3A there is arranged a similar pair of wheels 46 suitably journalled in the frame plates of the shuttle carriage. Guide wheels 47 mounted for rotation about a vertical axis ensure that the carriage does not "run out" from the rails and it will be understood that guide wheels 47 are mounted on each the tracking end 14T and drive end 14D of the shuttle carriage.

The shuttle carriage 14 is driven by a shuttle drive, gear motor 51 having an output drive sprocket 52 (FIG. 2A) for engaging the chain 43. A spaced pair of idler sprockets 53 are suitably journalled on the carriage frame for ensuring that the mesh is maintained between the drive chain 43 and output sprocket 52.

Figure 11:
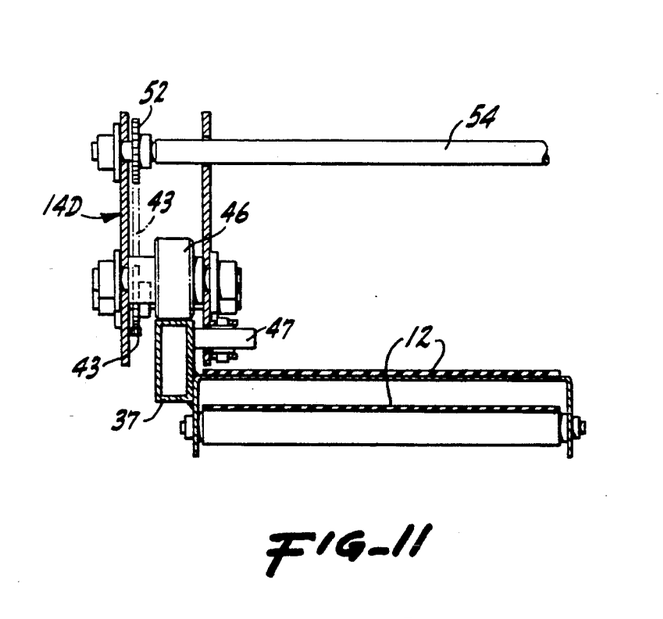
FIG. 11 is a sectional view in the scale of FIG. 10 and taken in the direction of the arrows 11—11 in FIG. 10.

The output drive sprocket 52 of the shuttle drive gear motor 51 is coupled to a drive shaft 54 which extends across the length of the bins to the tracking side 14T of the shuttle carriage where the shaft 54 is suitably journalled in the carriage frame and carries a tracking end drive sprocket 56, FIG. 11. A set of idler sprockets 53 mounted on the tracking side of the carriage 14T also serve to maintain the drive chain 43 in proper drive relation with the tracking end drive sprocket 56, FIG. 11.

The gear motor drive 51 for the shuttle is reversible so that the shuttle carriage 14 may be moved selectively from one of the bins to the other as the operator or a control program selects. Suitable locational stops (not shown) are provided so that the shuttle carriage 14 may be halted with respect to any bin 11 along a medial vertical plane of the bin so that the auger 39 is disposed to extend substantially along the medial center line of the bin for product in feed.

The auger drive gear motor 58 is mounted on the carriage frame as illustrated in FIGS. 2A and 3A. A gear motor drive 61 serves to drive the incoming portion in conveyor 12 and may be mounted as illustrated in FIGS. 2A and 3A.

One way in the past of overcoming the disadvantages of permitting a root crop or other product with a rounded rollable mass to free fall from an overhead conveyor into the bottom of a metal bin was to slope one wall of the bin so that the product could roll down the wall at a somewhat lesser velocity than full gravity acceleration. The disadvantage of this configuration was that the bin occupied, because of the sloping wall, an undue amount of plant space for the bin's given volume. A rectangular bin of full depth between its ends gives the best volume accommodation for the given area of floor space. To materially reduce bruising, cutting and pulverizing of products upon their unloading from the overhead conveyor and deposit into the bin, the applicants provide an array of baffle members in a cascade as shown in FIGS. 2A, 3A and 5.

More particularly, a cascade baffle array 66 is disposed in each of the bins proximate to and below the inward belt margin of the loading or incoming conveyor 12. Crops are removed from the conveyor by the auger 39 and will be transferred forthwith to the cascade array 66. A framework including four upstanding structural sections 67 extending from the vee bottom 28 provides support for the set of declined baffles 67, six being shown in FIG. 5. The baffles 68, 69 are arranged in the framework 67 which is otherwise open for product flow so that as increasing amounts of product fall into the cascade and the bin fills, the product rolls out of the cascade at various levels thus forming a pile of product in the bin. The pile of product will assume its natural angle of repose within the bin.

Figure 6:
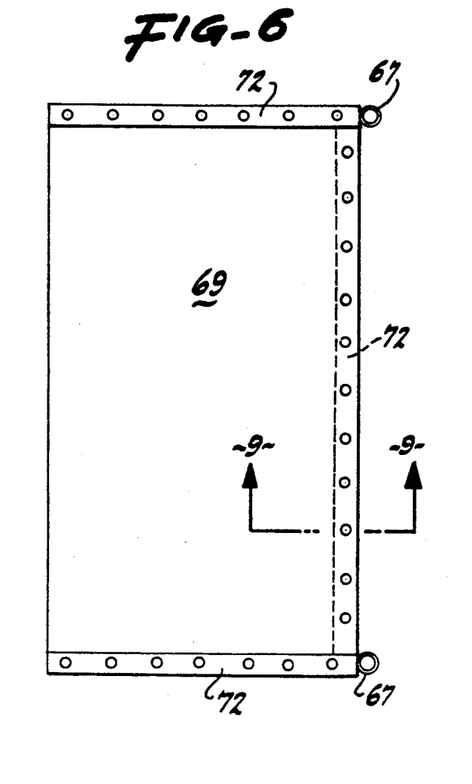
FIG. 6 and FIG. 7 are views taken in the direction of the arrows 6—6 and 7—7, respectively, from FIG. 5.
Figure 7:
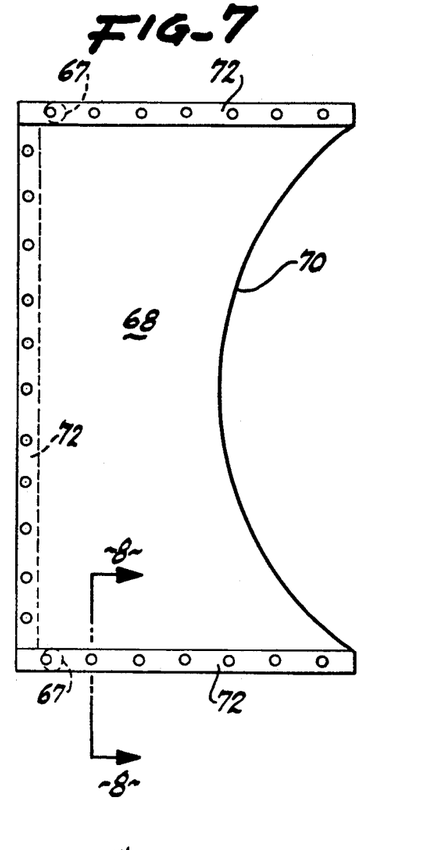
Figure 8:
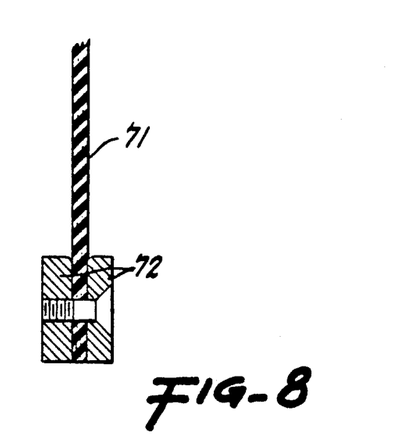
FIG. 8 is an enlarged fragmentary sectional view taken in the direction of the arrows 8—8 in FIG. 6.
Figure 9:
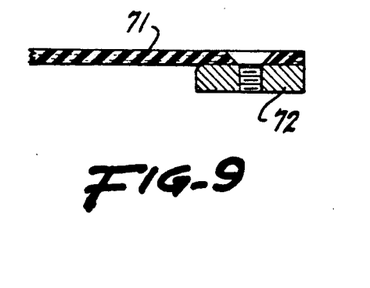
FIG. 9 is a view like FIG. 8 but taken in the direction of the arrows 9—9 in FIG. 7.

The baffles 68, 69 are arranged at various angles from the vertical marked with letters A, B and C. As may be seen in reference to FIGS. 6 and 7, the baffles are formed from two-ply neoprene belting material one half inch thick. The panels are generally rectilinear in plan and one of the of edges, the inward edge, of the baffles is unsupported so that the central portion of the baffle may "droop" as contrasted to being a fixed, taut member. Further, the second baffle 68 in the array has a scalloped edge 70 and this provision has been found to greatly facilitate a more gentle movement of the potato crops downwardly in the bin. The angles of the baffles A, B and C are as follows: angle A is on the order of 65°, angle B 60°, angle C 50° from the vertical. The inner edges of the baffles 68, 69 somewhat overlap and extend into the medial vertical plane of the bin so that the incoming product does not have occasion to free fall through the baffle array but will roll from one baffle to the next below. Once the baffle cascade begins to fill, product thereafter rolls outwardly from the cascade until the bin in the zone of the baffle array 66 has been filled with product. The remainder of the bin fills up to where the product will form a mound in the bin at its natural angle of repose. Conversely, when product is emptied from the bin, the openings or spaces 70 between adjacent baffles permit the product to flow into the path of discharge and out of the bin. It will be understood that the cascade array of baffles serves to permit a relatively gentle handling of the product during bin loading but does not impede the product from rolling freely from the bin into the discharge circuit.

It will be understood that the in-feed auger 39 is flighted for its full length across the bin and thus will distribute incoming products from the top of the pile tending to be formed to the far end of the bin once the volume of the incoming batch reaches the level of the auger 39. In this way the bin is filled.

OPERATION

Considering now the operation of the system and structures described above, it will be understood that there is arranged in a storage facility 16 a number of bins grouped in side by side relationship such as illustrated in plan view of FIG. 1. The bins are substantially identical, and in each is mounted a cascade baffle array 66 for gentle and efficient lowering of product into the bin at the time of loading. A load of raw products such as potatoes, onions, turnips, fruits etc. is received at the loading dock 17 and is unloaded onto the incline conveyors 18 where the product travels in the direction of the arrows 20 onto the conveyors 19, 21 where the product is deposited onto the loading or apportioning incoming conveyor 12 disosed in a horizontal plane over the bins 11. One of the several bins is selected by an operator to receive the products 40 and the shuttle carriage 14 carrying the auger 31 is positioned along the central portion of the selected bin 11 so that products reaching the auger will be removed from the conveyor belt 12 in the action as illustrated in FIG. 4. Whereas in prior constructions individual gates or "plows" were provided along the conveyor belt adjacent to each of the bins, these were found to become entrained with debris and broken products. One of the objectives and features of the invention is to eliminate the need for such gates.

The product 40 is moved from the conveyor 12 by the double flighted portion 41 of the auger into the cascade array of baffles 66 and descends there along to fill the vee bottom 28 of the bin having the discharge auger or belt 31. Being that the baffle array is supported on an open framework, the rollable product flows out of the array and into a pile within the bin. A loaded bin contains a substantial weight of product and a good portion of the mass is supported by the baffle load support 33 which serves to minimize the effect of arch action or bridging of potatoes or other root crop or fruit product in the bin during discharge. The presence of the load support baffle facilitates air flow within the bin and discourages a measure of anaerobic fermentation within the bin.

In normal operation of the system one or more bins may contain a similar product or each of the bins may contain a product of dissimilar characteristics, such as water content, sugar content, age or the like. When it is desired to remove product 40 from a bin 11 the discharge conveyor unit or auger 31 driven by the gear motor drive 32 is set into operation to supply product onto the discharge conveyor 13 for transfer onto the transfer conveyor 22 into the product processing stage. The water flume construction, FIG. 12, is also useful in transferring root crops into the processing line.

The provision of only a single auger for a group of bins for filling the same eliminates a large amount of machinery and costs which were associated with prior art arrangements. Further, the reduction in the number of augers and associated drive components is a direct cost benefit in the initial installation as well in reduced maintenance and upkeep. The arrangement of the bins as shown herein virtually eliminates the need for operators to work on the top side of the bins or to get down into the bins for breaking a bridge of product during a discharge or bin emptying.

The present invention may, of course, be carried out in other specific ways than those illustrated and described herein without departing from the spirit and essential characteristics of the invention. The present embodiment is therefore to be considered in all respects as illustrative and not restrictive, and all changes coming within the meaning and equivalency range of the appended claims are intended to be embraced herein.

We claim:

1. In a system for segregating and storing for reallocation a product having a rounded, rollable mass including potatoes, turnips, sugar beets, fruits and the like, the combination comprising;

a plurality of open top bins, generally rectangular in plan, arranged in side-by-side position and having substantial depth so that each bin can receive a substantial volume of product, incoming conveyor means and discharge conveyor means serving to move product into and out of a selected one of the bins, the incoming conveyor means including a conveyor belt arranged so that product thereon can be shifted therefrom into the open top of a selected one of the bins, the conveyor belt being arranged to serve all of the bins disposed in mutual side-by-side relation, shuttle carriage means operatively mounted for movement over the open tops of the bins and the conveyor belt, rotatable auger means mounted on the shuttle carriage for rotational movement above the conveyor belt and disposed for removing product from the conveyor belt, the auger extending transversely across the full product carrying width of the conveyor belt and along the length of the open top of a bin selected for filling, incoming conveyor drive means for moving product into the bins, shuttle carriage drive means serving to shift the carriage along a path over the bins to a bin selected for deposit of product therein, auger drive means serving to rotate the auger on the carriage for removing product from the conveyor belt arranged therebelow into the selected bin, and shroud plate means arranged on the carriage and extending across the conveyor belt serving to direct product into the rotating auger and inhibiting product from moving on the belt beyond the selected bin.

2. The bin system of claim 1 wherein the bin sidewalls, at least in the zone where the auger removes product from the conveyor belt, are generally vertical and including a cascade array of baffle members extending upwardly from the lower portion of the bin to below the conveyor belt for receiving product therefrom, said baffles being declined so that the rollable products may roll from one baffle member to another therebelow thereby lowering the products into the bin at a substantially slower rate than in a vertical fall and reducing bruising and breakage of the products.

3. The bin system of claim 2 wherein at least one of said baffle members is formed from a flexible, fabric-like material.

4. The bin system of claim 3 wherein the baffle member formed from the flexible, fabric-like material is disposed adjacent to and immediately below the plane of the incoming conveyor belt and is declined to an inwardly recessed margin of the baffle.

5. The bin system of claim 2 wherein the baffle members in the array are supported to provide product flow passageways between adjacent baffles through which product may flow into the bin when loading and out of the bin when product is being emptied from the bin.

6. In a system for segregating and storing for reallocation a product having a rounded, rollable mass including potatoes, turnips, sugar beets, fruits and the like, the combination comprising;

a plurality of open top bins, generally rectangular in plan, arranged in side-by-side position and having substantial depth so that each bin can receive a substantial volume of product, the bins being of generally similar construction and each including a Vee-shaped bottom portion, discharge conveyor means arranged to remove product from the lower portion of the Vee-shaped bottom of each bin, product support means arranged above said discharge conveyor means and extending lengthwise of the bins and configured to permit the product to flow thereover onto the discharge conveyor means without the product bridging over the conveyor, a product lowering, baffle array including a fixedly mounted, open framework extending upwardly from a plurality of the bin bottoms and having mounted thereon a plurality of declining, overleafed baffle members the lower margins of which overlie a portion of the next lower baffle in the array, incoming conveyor means for moving product into a selected one of the bins and including a conveyor belt extending along the open top of a bin to be filled so that product moving off from the conveyor belt will fall onto the baffle array and into the bin, shuttle carriage means operatively arranged for selected movement over the open tops of a plurality of bins, said carriage means being rollable along fixed rail means extending along the side-by-side bins, rotatable auger means mounted on the shuttle carriage and extending transversely across the full width of the conveyor belt, said auger being mounted with the flights of the auger closely spaced from the conveyor belt serving to remove product from the converor belt, the auger extending along the length of the open top of a bin selected for filling, and shroud plate means arranged on the shuttle carriage proximate to and coacting with the auger and extending across the conveyor belt serving to direct product toward the auger for movement onto the baffle array.

7. The bin system of claim 6 wherein the open framework of the baffle array provides product flow passageways between adjacent baffles and the vertical framework members so that incoming and outgoing product can move freely with respect to the bin containment volume.

8. The bin system of claim 7 wherein said baffle members are formed from a flexible, fabric-like material and at least one baffle member has a recessed lower margin, said baffle member being mounted adjacent to the incoming conveyor belt.

9. The bin system of claim 7 wherein said baffles are mounted with respect to the framework at angles of between 50 to 65 degrees from a vertical plane.

10. The bin system of claim 6 and including shuttle carriage drive means serving to shift the carriage along a path over the bins to a bin selected for deposit of product therein, and auger drive means serving to rotate the auger on the carriage for removing product from the conveyor belt arranged therebelow into the selected bin.

* * * * *